United States Patent
LeJeune, Jr.

(10) Patent No.: US 10,200,815 B2
(45) Date of Patent: *Feb. 5, 2019

(54) MONITORING SYSTEM AND METHOD WITH SIGNAL TAMPERING DETECTION

(71) Applicant: SATELLITE TRACKING OF PEOPLE LLC, Houston, TX (US)

(72) Inventor: David W. LeJeune, Jr., Conroe, TX (US)

(73) Assignee: SATELLITE TRACKING OF PEOPLE LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/963,276

(22) Filed: Apr. 26, 2018

(65) Prior Publication Data

US 2018/0249288 A1 Aug. 30, 2018

Related U.S. Application Data

(63) Continuation of application No. 14/946,954, filed on Nov. 20, 2015, now Pat. No. 10,009,721.

(51) Int. Cl.
| | |
|---|---|
| *H04W 4/021* | (2018.01) |
| *H04W 4/02* | (2018.01) |
| *G08B 29/04* | (2006.01) |
| *H04W 4/08* | (2009.01) |
| *G08B 21/02* | (2006.01) |

(52) U.S. Cl.
CPC .......... *H04W 4/021* (2013.01); *G08B 21/028* (2013.01); *G08B 21/0272* (2013.01); *G08B 29/046* (2013.01); *H04W 4/023* (2013.01); *H04W 4/08* (2013.01)

(58) Field of Classification Search
CPC ....... H04W 4/021; H04W 4/023; H04W 4/08; G08B 21/0272; G08B 21/028; G08B 29/046
USPC ...................................... 455/456.3
See application file for complete search history.

(56) References Cited

U.S. PATENT DOCUMENTS

| | | | |
|---|---|---|---|
| 5,771,001 A | 6/1998 | Cobb | |
| 8,478,297 B2 * | 7/2013 | Morgan | ............... G01S 5/02 455/41.2 |
| 2005/0020309 A1 | 1/2005 | Moeglein et al. | |
| 2005/0068169 A1 | 3/2005 | Copley et al. | |
| 2007/0135140 A1 | 6/2007 | Tervo | |
| 2011/0219226 A1 | 9/2011 | Olsson et al. | |
| 2013/0276017 A1 | 10/2013 | Walker et al. | |
| 2016/0192136 A1 * | 6/2016 | Pan | ............ H04W 12/06 455/456.1 |

* cited by examiner

*Primary Examiner* — William Nealon
(74) *Attorney, Agent, or Firm* — Polsinelli PC

(57) ABSTRACT

A system and method for detecting potential tampering with a data stream from a monitoring device is provided. The method includes storing a list of cellular receivers and at least one corresponding geographic characteristic; receiving, from a remote monitoring device through a cellular network, a location of the monitoring device and the identity of a particular cellular receiver that relayed the location; identifying, from the received location and the stored at least one corresponding geographic characteristic, an expected cellular receiver from the list of cellular receivers; comparing the particular cellular receiver with the expect cellular receiver; and issuing an alert based on at least a negative result of the comparing.

20 Claims, 11 Drawing Sheets

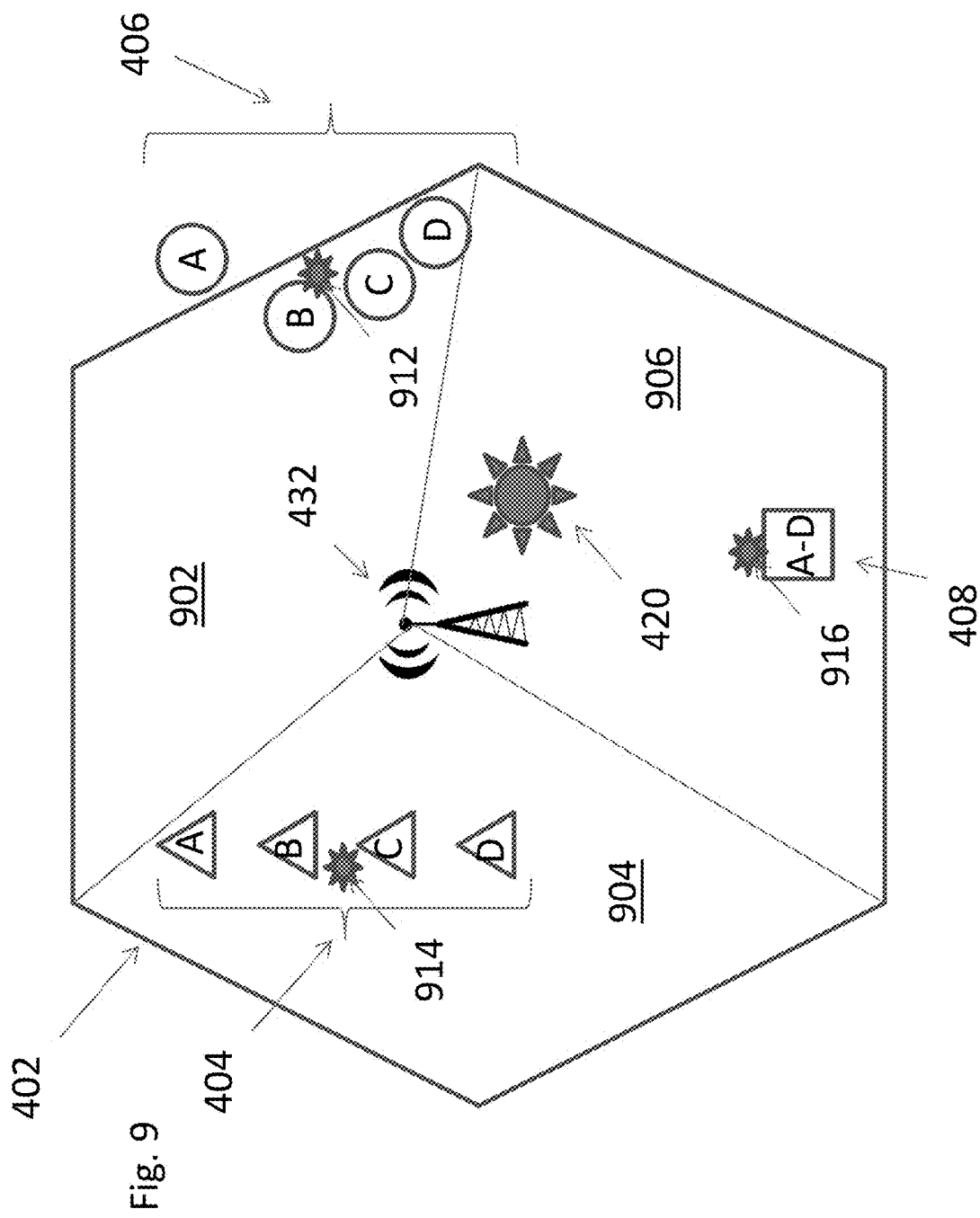

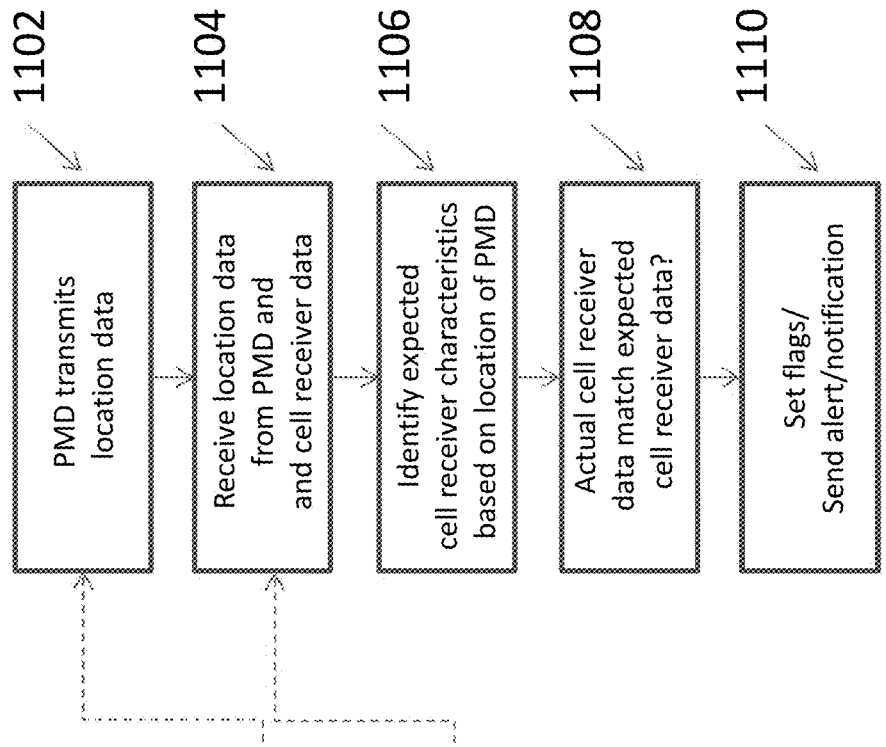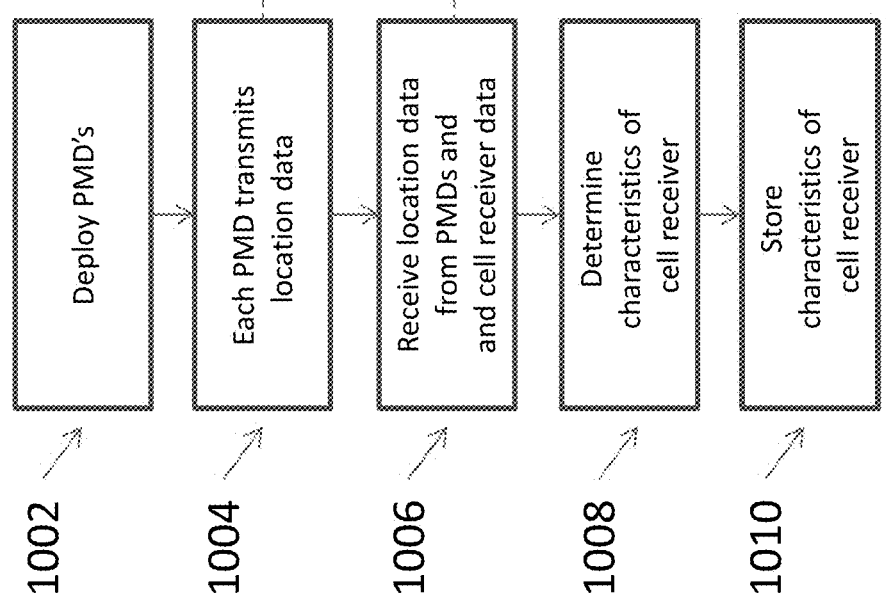

MONITORING SYSTEM AND METHOD WITH SIGNAL TAMPERING DETECTION

CROSS REFERENCE TO RELATED APPLICATIONS

The present application is a continuation of U.S. patent application Ser. No. 14/946,954 entitled MONITORING SYSTEM AND METHOD WITH SIGNAL TAMPERING DETECTION filed on Nov. 20, 2015, the contents of which are expressly incorporated herein by reference.

FIELD OF THE INVENTION

The various embodiments described herein relate generally to preventing signal tampering with monitoring devices. More particularly, various embodiments herein relate to detecting attempts to access cellular transmission of monitoring devices.

BACKGROUND

The monitoring of movements of monitored individuals involves a variety of sectors, including parolees and home confinement. The technology has its roots in the home arrest systems of the 1980's, in which a user wearable component—typically a "beacon" anklet that was locked to the monitored person—would communicate wirelessly with a stationary base unit. The range was limited to a few feet of the radio frequency transmitter and receiver. The base unit included a telephone connection for communicating with the authorities. If the monitored person left the short range allowed by the equipment, the tag and the base unit would lose contact and the base unit would respond by sending an alert to the authorities.

A later generation of the technology incorporated GPS and cellular telephone technology in a locked anklet. The device would actively record the location of the monitored person over time and transmit the data to a central monitoring location (e.g., police or parole monitoring services). The central location could store and analyze the data for prohibited movements (e.g., a sex offender near a school) or cross reference the movement data with crime data to see if the monitored person was near the crime at the time of the crime. U.S. Pat. Nos. 5,867,103, 6,160,481, 6,218,945, 6,512,456 and 6,703,936, incorporated herein by reference in their entireties, are each exemplary of such a system. The technology is also used to monitor other personal sectors (e.g., patients, children) and objects (e.g., cars, cargo).

The modern monitoring device includes a GPS receiver that determines location, a memory that stores location data over time to define a movement history, and a cellular modem that communicates the movement history to a central location through the cell network. A common implementation is in the criminal justice system as an alternative to incarceration, and monitored persons (typically parolees) have tamper resistant devices attached to their leg or wrist.

Various attempts have been made to circumvent the monitoring devices via an external modification to prevent receipt of GPS signals and/or transmission of the movement data. Examples of such attempts include wrapping the monitoring device in foil or generating a local jamming signal.

An area in which monitoring devices have historically been immune to interference is hacking into the data transmission of the device itself. The tracking devices include various tamper detection methodologies, such that any attempt to breach the shell of the monitoring device and access the inner electronics would be detected (either electronically or by the visible physical damage to the casing). The cellular networks that the devices communicate with have historically been generally inaccessible to the public. Some monitoring devices also communicate locally (wifi range) with trusted dedicated receivers that also include various tamper detection methodologies, such that any attempt to breach the shell of the trusted dedicated receivers and access the inner electronics would be detected (either electronically or by the visible physical damage to the casing). Absent access to the internal electronics or cell network, the data stream from the monitoring devices is secure.

In recent years, various technologies have emerged that allow a greater degree of local access to cellular communications. For example, some telecommunication companies now provide cellular base stations that mimic a small cell tower and provide local cellular service through a high speed Internet connection; the Samsung SCS-26UC4 Verizon Network Extender Base Station is an example of such a device. Similar (in some cases illegal) technologies also allow users to construct their own local cellular base station through their laptop or PC. These devices have an open air range of several dozen yards, less so when in an enclosed building.

Monitoring devices tend to use standardized cellular modem technology that switch between cell towers as appropriate. Such devices under appropriate conditions could detach from the local cell tower and attach to a local legal/illegal short range cellular base station. Data flow from the monitoring devices would thus be passing through this local connection.

BRIEF DESCRIPTION OF THE DRAWINGS

Various embodiments in accordance with the present disclosure will be described with reference to the drawings, in which:

FIG. 9 illustrates the embodiment of FIG. 4 with directional antennas.

FIGS. 10 and 11 are flowcharts of an embodiment of the invention.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Several definitions that apply throughout this disclosure will now be presented. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. The terms "cell receiver" or "cellular receiver" refer to a device such as a cell tower or cellular base station that communicates with the cellular modem of a monitoring device. The term "monitored population" or "population" refers to a group of persons and/or objects that are subject to monitoring.

Figure 1:
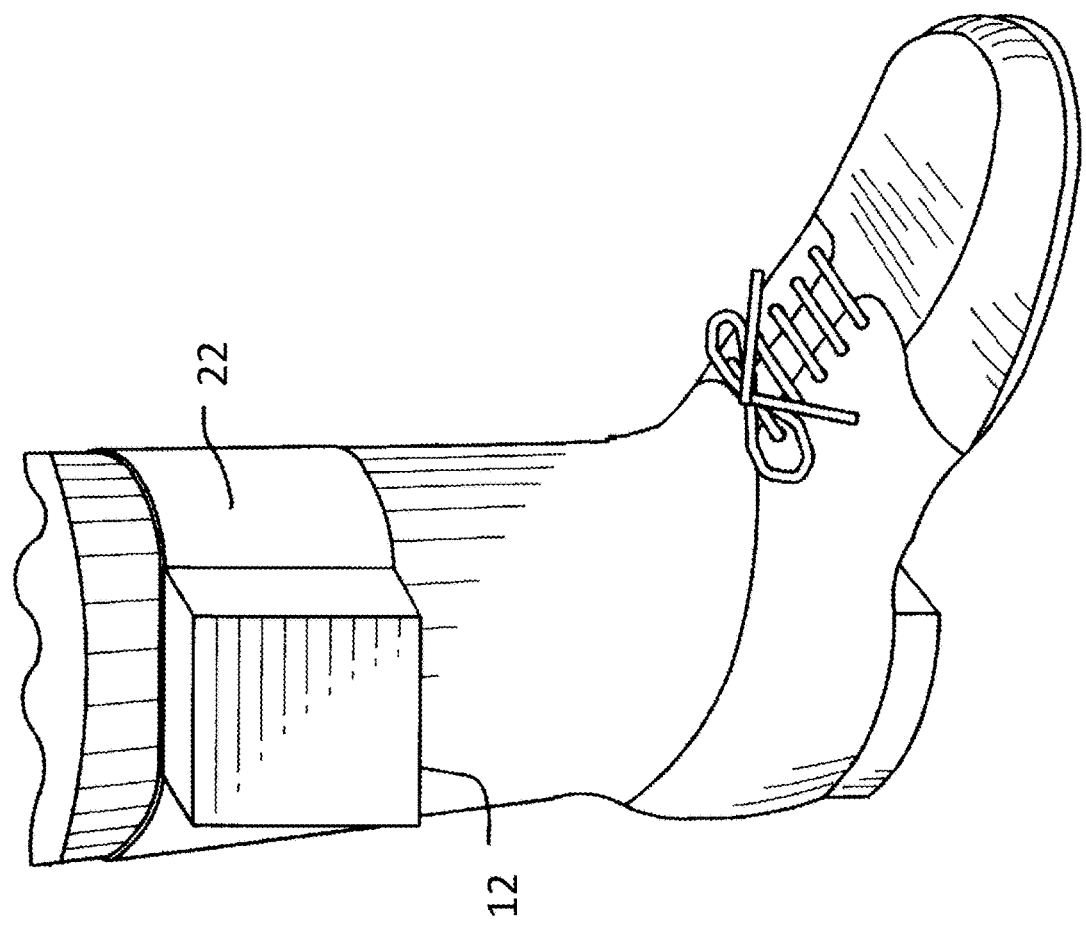
FIG. 1 illustrates an embodiment of a monitoring device attached to an ankle of a user.

FIG. 1 shows a block diagram of a monitoring device 12 according to an embodiment of the invention. A monitoring device 12 can determine its location, such as through the Global Positioning Satellite, cell towers, LORAN, or other known methodologies; for sake of brevity discussion herein is confined to GPS, although the invention is not so limited. Device 12 is shown as a one-piece unit, although multiple pieces as known in the art could also be used.

A band 22 secures monitoring device to a limb of the user, typically the ankle, via a locking mechanism that preferably can only be opened by an authorized person. An ankle is shown in FIG. 1, although the invention is not limited thereto. Monitoring device 12 and band 22 preferably have tamper detection capabilities as is known in the art and not discussed further herein. The invention is not limited to any particular securing and/or tamper detection methodology.

An authorized person would be one or more people having some type of supervisory responsibility and/or decision making relative to the monitored person. By way of non-limiting example, a parole officer would be the authorized person relative to a parolee. Other non-limiting examples include parent/child, patient/medical supervisor, etc. Security and/or police could be considered an authorized person relative to a population of monitored persons to the extent the emergency level intervention is necessary. For sake of brevity, discussion herein is confined to parolee/parole officer relationship, although the invention is not so limited. The invention also applies to objects that can be monitored, such as cars or cargo.

Figure 2:
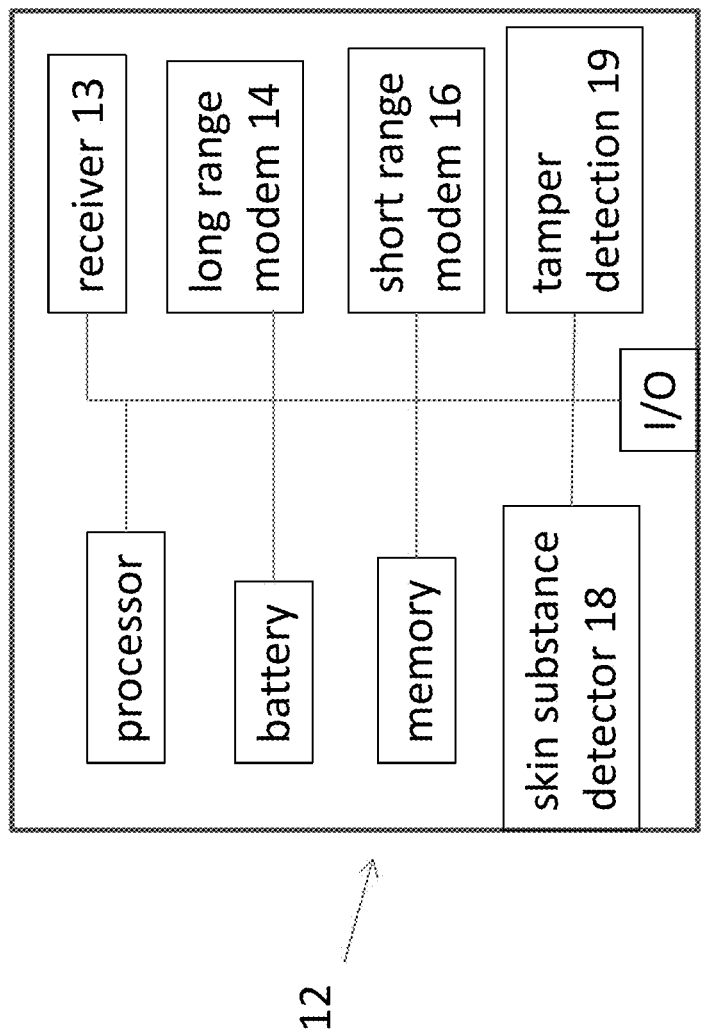
FIG. 2 illustrates an embodiment of the internal components of the monitoring device of FIG. 1.

Referring now to FIG. 2, a non-limiting example of monitoring device 12 includes a dedicated circuit for determining its location, such as a GPS receiver chip 13. A cellular modem 14 preferably provided with a SIM card allows the monitoring device 12 to communicate through the cellular network with a central monitoring station 40. A short range wireless modem 16 (e.g., 915 MHz or 802.11 compatible Wi-Fi or Bluetooth) allows the monitoring device 12 to communicate locally with other devices within the short range as is known in the art for such devices. Modems 14 and 16 may be the same modem operable to communicate on different frequencies. A substance detector 18 may be provided to monitor the presence of prohibited substances in the monitored individual, such as through a sensor in contact with the skin; the configuration of substance detectors within a portable monitored device are known by those of skill in the art and not further discussed herein. Tamper detection mechanism 19 monitors for tamper detection as is known in the art. Batteries, a power port, memory, I/O interface, wired communication access and other supporting computer hardware and software as is known in the art are also preferably provided and not discussed further herein. Monitoring device 12 may be integrated into a single unit or multiple units as is known in the art. The invention is not limited to the details of the architecture of monitoring device 12.

Figure 3:
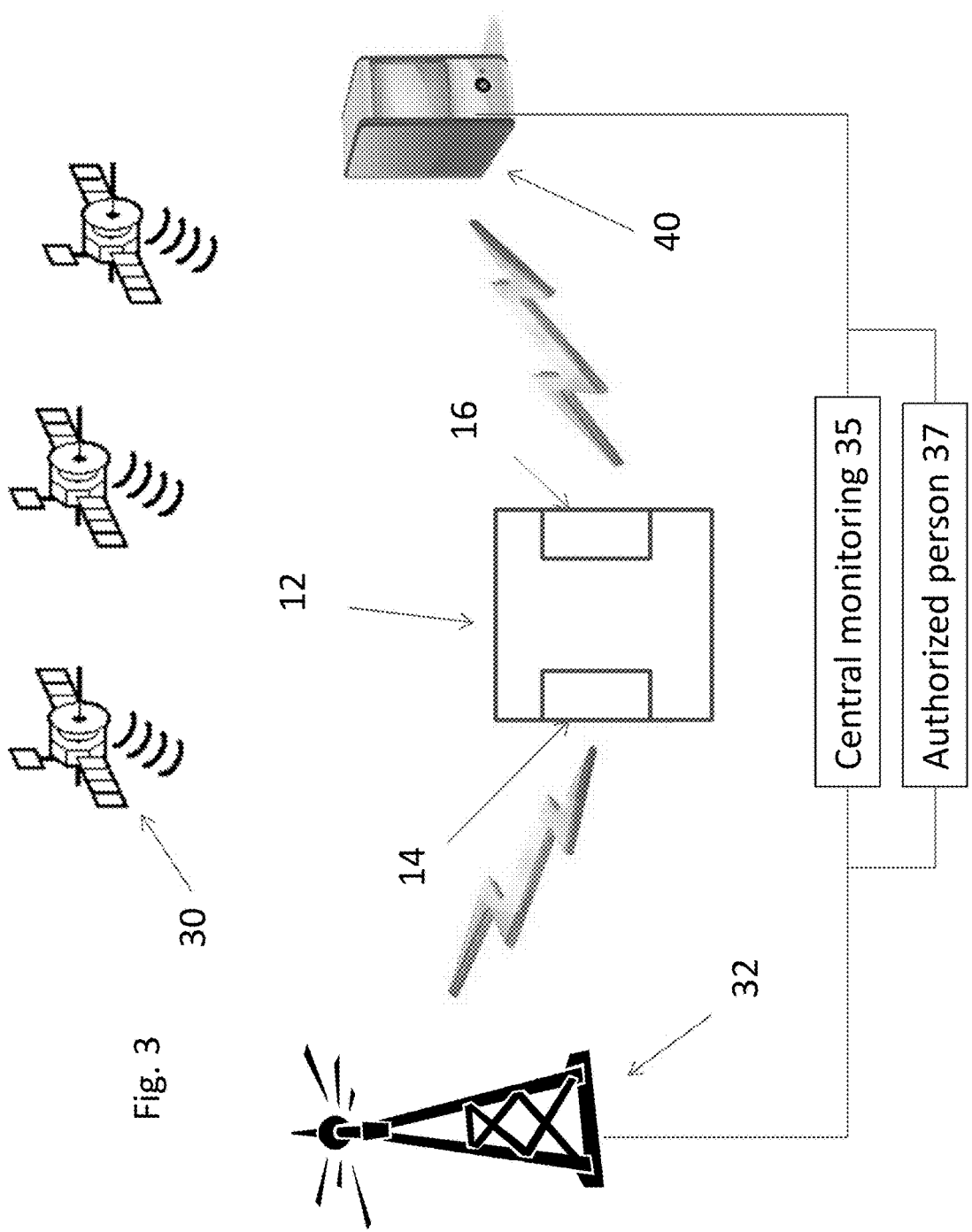
FIG. 3 illustrates an operating environment of the monitoring device of FIG. 1.

Referring now to FIG. 3, monitoring device 12 is shown in an operating environment. Multiple satellites 30 provide the GPS timestamps that GPS receiver 13 in monitoring device 12 converts into location information. The location information represents the location of the monitoring device 12, and by extension the location information for the monitored individual, at a particular time. Monitoring device 12 can transmit that information as location data in near real time, and/or can store the location information as location data in memory and batch transfer collected location data as dictated by the need of the system (e.g., on a fixed and/or random schedule, or in response to an event or specific instruction to do so). If substance detection capability is present, then information relating to screening(s) may be similarly stored, transmitted in near real time or batch transmitted collectively, either with or separately from the location data.

Monitoring device 12 preferably has at least two options for remote communications, including data transfer. The first is through the short range modem 16 with a trusted home monitoring device 40 when within the range (e.g., <300 feet, more particularly about 50-100 feet) of the short range modem 16. The second is through the cell/long range modem 14 (potentially miles) to a cell tower 32 when the monitoring device is out of range of the home monitoring device 40. Preferably both cell tower 32 and home monitoring device 50 connect to central monitoring location 35 and/or an authorized person 37, whether directly or through intervening equipment as known in the art.

Central monitoring location 35 is "central" in the sense that it serves one or more monitoring devices 12. It may be a single location, multiple locations operating independently, or a distributed arrangement. At a most basic level the central monitoring location 35 is no more than a computer (e.g., a server) having a memory, processor, modem, input/output, and other supporting computer hardware and software as is known in the art, although in practice they may be large facilities with distributed computers and human handlers. The invention is not limited to the architecture or layout of the central monitoring location 35.

The monitoring device 12 obtains geographic location information and exchanges the location data with the central monitoring location 35 and/or the authorized person 37. The monitoring device 12 generally transmits location data updates to the central monitoring location 35, either directly or through home monitoring device 40 (inclusive of intervening equipment as necessary, such as the cell network).

The data received by central monitoring location 35 from the monitoring devices 12 includes a combination of information related to each monitoring device 12 and information about the cell tower 32 that relayed information from each monitoring device. Types of information from devices 12 are well known in the art, but generally includes at least some type of identification of the particular device 12 (e.g., a device identification number) and location data. Information about cell tower 32 includes at least some type of identification of the particular tower (e.g., the cell tower ID), but may also include MCC Mobile Country Code, MNC Mobile Network Code, LAC Location Are Code, CID Cell Identification. Signal strength and timing advance may also be included to provide information further defining the location of a monitoring device 12 within the coverage area itself.

The information about cell tower 32 can be determined by monitoring device 12 via its connection with cell tower 32 (e.g., the monitoring device 12 could through handshaking with the cell tower 32 know the identity of the cell tower 32 and add that information to its communications with central location 35). In the alternative, the information about cell tower 32 could be incorporated by cell tower 32 directly as it forwards data from the monitoring device 12 to central monitoring location 35. Combinations of the two are also possible. The invention is not limited to the manner in which information about cell tower 32 is obtained and paired with the location data sent by the portable monitoring device 12.

Figure 4:
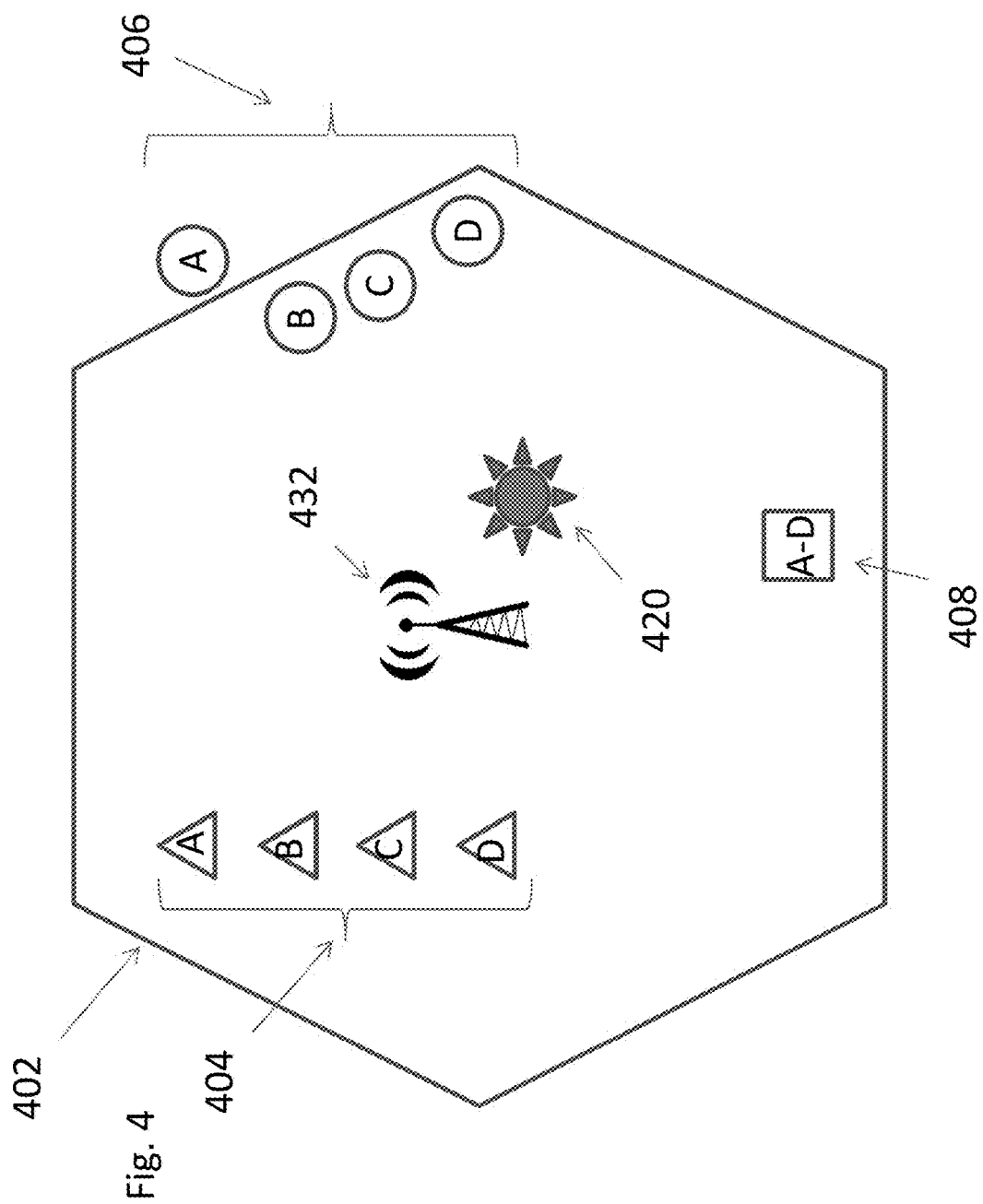
FIG. 4 illustrates movement of monitored individuals over time relative to the operating boundary of a cell tower.

Central monitoring location 35 receives the information and uses the location data along with cell tower information to determine geographic characteristic of the particular cell tower 32. By way of non-limiting example, FIG. 4 shows movement data for three people 404, 406 and 408 relative to an omnidirectional cell tower 432 with identification code 432 having an operating range defined by a boundary 402 (which may in part be dictated by adjacent cell towers, not shown). Each step A-D represents the location at a point in time, e.g., 9:00 AM, 9:02 AM, 9:04 AM, etc. Person 402 moves along a path (indicated by triangles) that stays entirely within the range of the cell tower 432 during the period. Person 406 moves along a path (represented by circles) that is initially outside the range of cell tower 432 and then moves into range. Person 408 is a stationary person (e.g., asleep) with no movement during the period and thus a path represented by a single square. Information for each movement point within boundary 402 (404A-D, 406B-D and 408A-D) as received by central monitoring location 35 represents a correlation between cell tower 432 and a geographic location within boundary 402. In contrast, point 406A is outside the boundary 402, and thus would be associated with a different cell tower.

Location data received for monitoring devices 12 received from cell tower 432 (404A-D, 406B-D, and 408A-D, but not 406A) can be analyzed to define geographic characteristics of cell tower 432. By way of non-limiting example, the location data can be combined to define an artificial position marker 420 that represents a point of average movement with boundary 402. Under ideal conditions, uniform movement of a monitored population within boundary 402 would result in an "average" position for artificial position marker 420 that would coincide with the exact physical location of cell tower 432. As a practical matter activity is often not that uniform; for example, if cell tower 432 is adjacent to a small town where the monitored group spends most of their time, then position marker 420 would tend to be within the town and away from the cell tower 432.

In combination with an allowable distance from the artificial position marker 420, central monitoring location 35 would be able to define an area relative to artificial position marker 420. This effectively establishes tower 432 as the expected cell tower for that area.

Figure 5:
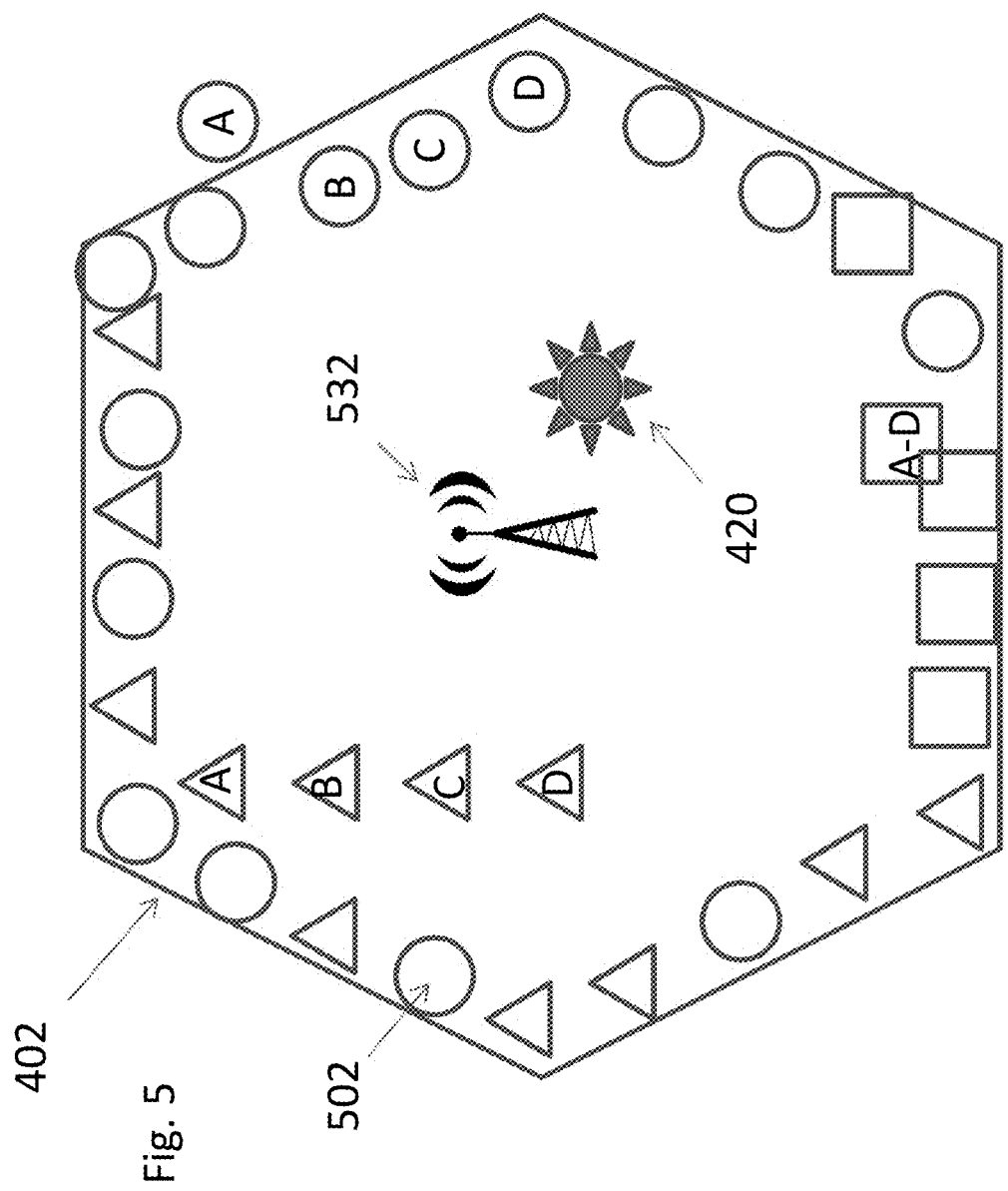
FIG. 5 illustrates movement of monitored individuals over time near the operating boundary of the cell tower of FIG. 4.

Another non-limiting example of use of the location data received from monitored devices 12 within the boundary of cell tower 432 is to define an approximate boundary of the coverage of cell tower 432. Specifically, the central monitoring location 35 can recognize that any location data with the cell tower ID (or other cell tower identifying information) of cell tower 432 is within the range of cell tower 432. Referring now to FIG. 5, over time the continued accumulation of locations 502 (represented by circles, triangles and squares) reported by monitoring devices 12 would provide an approximation of the outer boundary 402. To the extent that the monitored population does not uniformly travel over the entire area covered by cell tower 432, then the location data would at the very least establish an outer border of expected movement of the monitored population relative to cell tower 432. This effectively establishes tower 432 as the expected cell tower for the area.

Figure 6:
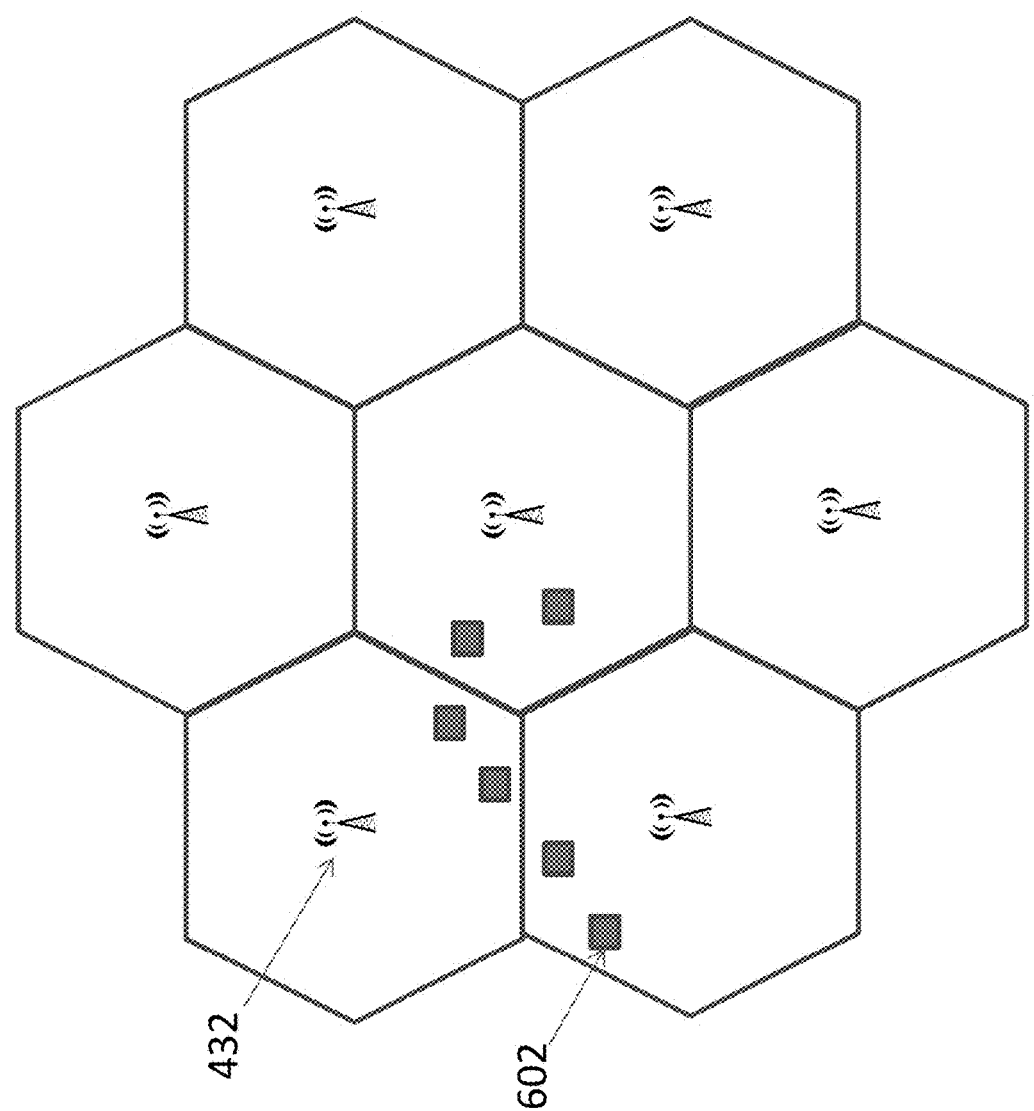
FIG. 6 illustrates movement of a monitored device through a network of cell towers.

The embodiments discussed above have primarily been addressed in the context of a single cell tower 432. While there are a limited number of circumstances in which a single tower is in use, typically a network of adjacent towers 432, such as shown in FIG. 6, collectively cover a monitored population. The methodology herein forms geographic characteristics of the individual cell towers within the network as the monitored population (represented generically by 602) moves within the network. Note the methodology would typically only address those towers within the network that provide some service to the monitored population, and as such it may be expected that not every cell tower will have corresponding geographic characteristics available at central monitoring location 35. Central monitoring location 35 stores the noted geographic characteristics relative to cell towers 432 from which it receives location data.

As central monitoring location subsequently receives new uploaded location data from monitored devices 12, central monitoring location 35 monitors the incoming information and notes any of a potential number of irregularities in the expected data. A non-limiting example of any irregularity is that the received cell tower ID is not consistent with that expected from the location data. Central monitoring location 35 can compare the location at the approximate time of the upload with the collected geographic characteristics to identify the corresponding "expected" cell tower that would/ should have transmitted the corresponding location data. Receiving GPS data that had a different cell tower ID than cell tower 432 would be an irregularity, and is indicative (but not necessarily conclusive) that the signal has been intercepted by a local base station.

Figure 7:
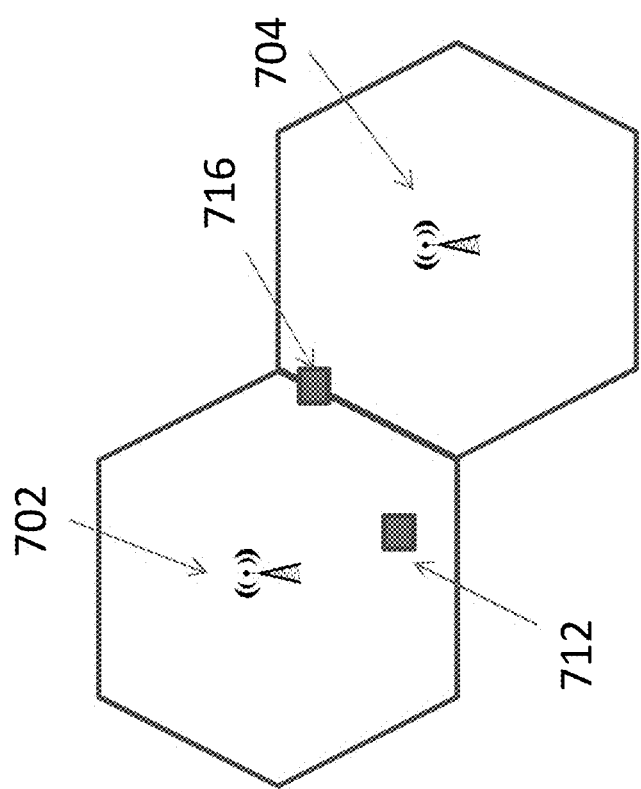
FIG. 7 illustrates connection of a monitoring device relative to adjacent cell towers.

By way of non-limiting example, and referring to FIG. 7, two adjacent cell towers 702 and 704 are shown. A monitored device 712 uploads its location data to central monitoring location 35 through cell tower 702. Central monitoring location 35 determines from the received location data the location of the monitoring device 712 at the time of upload. Based on that location, central monitoring location 35 determines that from the prior stored geographic characteristics that a monitored device at that location should be uploading through cell tower 702. Central monitoring location then compares whether this is in fact the case, i.e., whether cell tower 702 actually relayed the location data as expected. When there is a match (as is the case in FIG. 7), the system is operating as intended.

Figure 8:
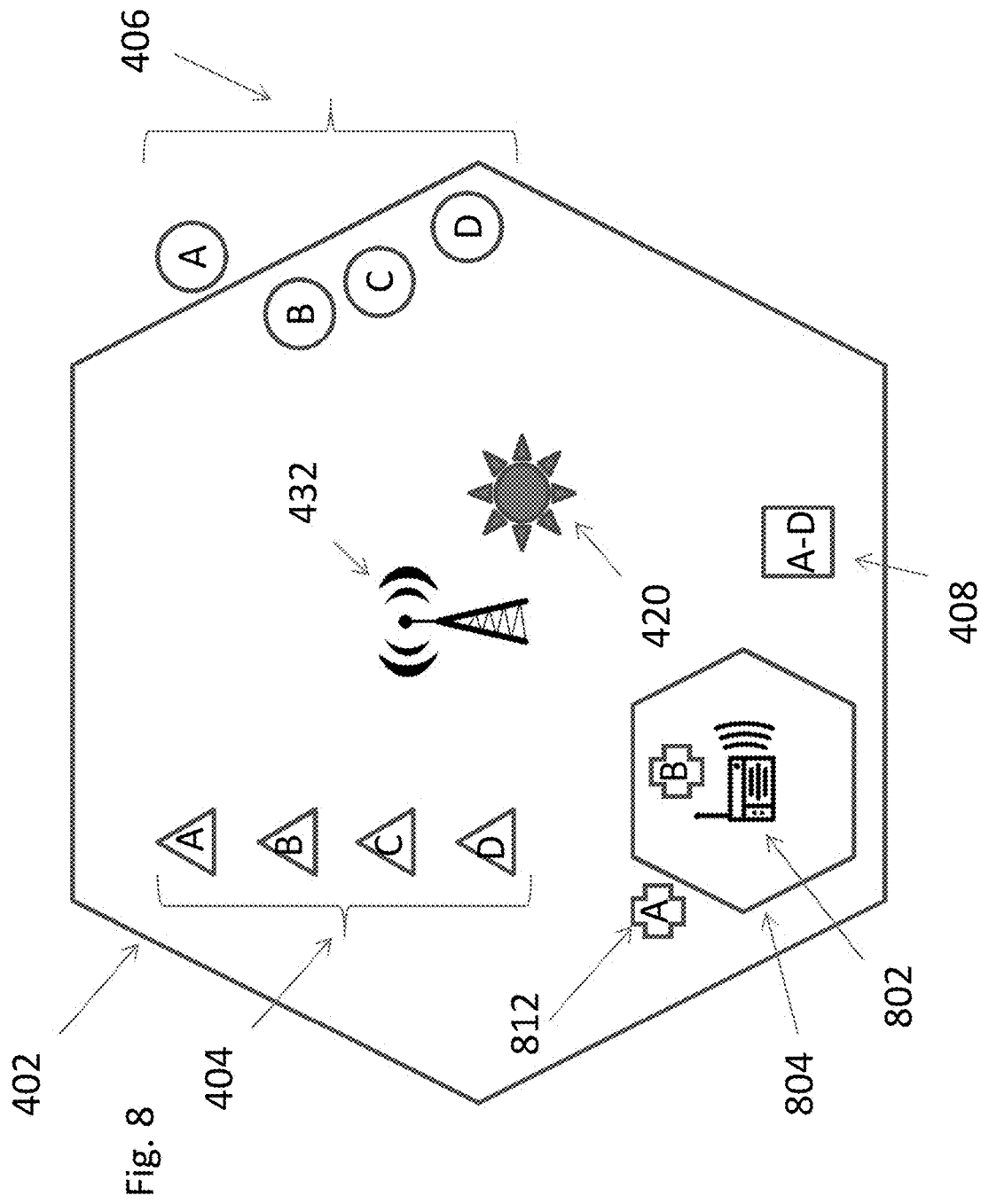
FIG. 8 illustrates a cellular base station operating within the boundary of the cell tower of FIG. 4.

Referring now to FIG. 8, a counter example is shown in which location data is received from an unexpected cell receiver. The example is illustrated in the environment of FIG. 4, in which a person installs a local cellular base station 802 (which may be legal or illegal) connected to their local high speed internet, and which has an operating range defined by boundary 804 (either its open air range, or as limited by intervening structures). A monitoring device 812 at time A uploads its location; since device 812 is outside of the range of local base station 802, the upload is through cell tower 432 and central monitoring station will receive the cell tower ID for cell tower 432. Based on the location of device 812 at time A cell tower 432 is the expected cell tower. This represents routine operating conditions and would not indicate anything amiss, as was the case in FIG. 7.

At time B, monitored device 812 has moved into range of cellular base station 802, and cell modem 14 per its standard protocol will detach from cell tower 432 and attach to the cellular base station 802. Monitoring device 812 will thus upload to central location 35 bearing the cell ID of the cellular base station 802, and not that of cell tower 432. Central monitoring location 35 for its part determines that location B should have uploaded from cell tower 432 as the expected cellular receiver, and then determines that upload was relayed by something unexpected, in this case cellular base station 802.

Central location 35 can flag this discrepancy and report the same to the authorities. The authorities can go directly to the area that the GPS data indicated that monitoring device 812 was proximate to base station 802 and physically investigate potential foul play. On the other hand, if upon investigation the base station 802 is considered legitimate (e.g., a lawfully issued local base station that happens to be operating at the location), the central monitoring location 35 can update its database to reflect the same, essentially adding base station 802 to the list/map of possible cell receiving sources.

As an addition and/or alternative, there is a known preference in the art to minimize the reliance on authorities to avoid desensitizing them to alerts; this could particularly be the case given the presence of legal base stations sold by telecom vendors and for which have non-nefarious purpose. It may therefore be desirable to conduct alternative/complementary analysis of the data to provide a superior estimation of the risk provided by the data.

One such test would be to distinguish between legitimate and illegitimate cell sources. A legal and legitimate cellular base station from a provider such as Verizon or AT&T may pose a lower concern than an unregistered cellular base station. Central location 35 can thus monitor the incoming data from base station 812 for indicia of a particular trusted cellular carrier. The presence of that indicia would indicate a legitimate cell receiver, while the absence of that indicia would indicate an illegitimate cell receiver.

Another such test would be the number of monitored devices 12 sending data through cellular base station 802. If central location 35 identifies several devices using base station 802, this may indicate that base station 802 is legitimately provided to supplement cell coverage in large areas, such as a workplace or mall; it could also be a backup cell tower taking over for a failed main cell tower. If central location 35 identifies a small number of devices 12, or a single device 12, which may use base station 802 continuously, this may indicate that base station 802 is an illegitimate cell source.

Another such test is whether base station 802 has moved. Specifically, central monitoring location can determine geographic characteristics about base station 802 in the same manner as cell tower 432; the operating range is smaller, but the principles remain the same. If base station 802 was moved to a different location, then the GPS data would be inconsistent with the expected location of base station 802.

Another such test is to determine whether the received cell tower information corresponds to a nearby cell tower. For example, in FIG. 7 monitoring device 712 is in range of cell tower 702 but could be attached to cell tower 704. There are a variety of reasons this could occur. For example, cell towers can malfunction, and if cell tower 432 malfunctions then monitoring device 12 could attach to a different nearby cell tower. In another example, various location determination methodologies are known to have a range of error, and even though the location indicates that the monitored person is in a location consistent with one cell tower they are in fact at a location consistent with another cell tower. The boundaries of cell towers themselves are not necessarily static, and can shift based upon environmental and power conditions. Connecting to an adjacent cell tower could be a common occurrence when a monitoring device is moving near or crossing a border of two cell towers, such as monitoring device 716 in FIG. 7. The invention is not limited to the manner that a monitoring device 12 may indicate a relationship with a nearby cell tower.

Another test is to determine whether the data indicates a concern for a non-cell tower issue. For example, the data from monitoring device 12 may indicate that the monitored person may have consumed alcohol. The combination of alcohol consumption in conjunction with a cell tower irregularity could prompt a higher level of priority and corresponding reaction. The types of non-cell tower issues in the art are well known and not discussed further herein.

Other possible tests may relate to factors that are not specific to the tracking environment, but rather more specific to the cell environment. Central monitoring location 35 could store such cell tower information and conduct comparisons in the same manner as the tracking environment above.

By way of non-limiting example, the LAC of the current base station may differ from the LAC of many neighboring cells. Either alone or in combination with MCC and MNC and prior location data, an irregularity is detected. In essence the central monitoring location 35 is receiving cell information that does not correlate to what was previously collected by monitoring devices near the reported location.

By way of another non-limiting example, a variance in the channel numbers or frequency for same LAC/CID may indicate an irregularity. In this case the same LAC/CID is detected but on an unexpected channel or frequency.

By way of another non-limiting example, cell information may include information for neighboring cells, and the absence of that information may indicate an irregularity. A base station 802 may try to prevent a monitoring device from transitioning back to a regular cell tower. For that reason a base station 802 may announce no neighboring cells such that the monitoring device will use base station 802 until its signal level is too low to maintain the attachment.

By way of another non-limiting example, signal strength and/or timing advance irregularities could be detected. These qualities could be mapped against location and maintained in a database. Unexpected changes in those parameters could indicate an irregularity, e.g., a traditionally weaker signal for a particular cell source at a location suddenly has an extremely strong signal.

Monitoring systems may be set with different levels of reaction to certain circumstances. By way of non-limiting example in the parole space, reactions may be reporting, which may include, one-per day reporting, reporting immediately to probation, and/or reporting immediately to police. For example, the amount of alcohol consumed and the location of the monitored person at the location are factors; a small amount of alcohol at home may be a non-event, but a large amount of alcohol near a school can be a priority matter. An irregularity in the cell tower data as discussed herein could be a modifier in the level of action. For example, detection of consumption of a small amount of alcohol at home may be a no-reporting event, but if in combination with a cell tower irregularity may prompt a higher level of concern (e.g., report immediately). In the alternative, central monitoring location 35 could change the status of the monitoring device 12, such as by increasing the data transfer rate or issuing a warning to the monitored person. In other circumstances reactions may include logging or the recordings of data.

In some embodiments, every instance of location data includes corresponding cell tower information. In other embodiments, only some of the location data includes the corresponding cell tower information. The embodiments are flexible to utilize all location data that has cell information, or only some of that information. By way of non-limiting example, as noted above monitoring devices 12 may transmit their location data in near real time or batch transfer location data after periods of accumulation, for which interest might only be in the location of the monitoring device 12 at or near the time of transfer (e.g., last minute before transfer in 1 ten minute transfer cycle); it may therefore not be necessary to analyze all location data, but rather only the most/more recent location data.

Embodiments herein discuss the bulk of the methodology being performed by the central monitoring location 35. However, the invention is not so limited, and some or all of the operations may also be performed at monitoring device 12.

The above embodiments have been in the context of an omnidirectional cell tower 432. However, the invention is not so limited, and directional cells towers can be used. As is known in the art, directional cell towers with multiple directional antennas create sectors within a particular cell. Embodiments herein can be applied to geographic characteristics of the cell tower collectively (e.g., collective considerations of all sectors assigned to a tower), or to the geographic characteristics of the individual sectors. In the latter case the particular directional antenna for each sector could be considered its own cell receiver.

By way of non-limiting example, a group of cell sectors are expected within the range of the cell tower. An anomaly would be to receive data from a cell receiver other than the expected group of sectors.

A directional example is shown with respect to FIG. 9, in which the range of cell tower 432 of FIG. 4 is split into three sectors 902, 904 and 906 by three directional antennas. As in the prior embodiments, the range of the entire cell tower could be used for the geographic characteristics. In the alternative, sector based geographic characteristics could be used, such as maps or individual artificial markers 912, 914 and 916 for each sector.

In implementation, organizations often operate independently and/or with some degree of cooperation. For example, a similar system could be operated by a California correction authority and a New York correction authority. Each such system may be operated independently. In the alternative, they could share information about the cell towers within their areas to cover the event of travel between the two by members of the monitored population.

Referring now to FIG. 10, various steps in an embodiment of the methodology are shown for developing the geographic characteristics of the cell receivers. At 1002, a plurality of monitoring devices is provided to a monitored population. Each of the monitoring devices can transmit via cellular modem at least location data representing its approximate location. It is to be understood that this step may be a static one time deployment, but more likely is an ongoing effort that adds and subtracts monitoring devices as the monitored population changes (e.g., new parolees enter while some parolees are released).

At 1004, over a period of time each of monitoring devices transmits at least location data representing its location, either in near real time or as a batch transfer of accumulating locations over time. At 1006, central monitoring location receives the location data from the monitoring devices, along with information about individual cell receivers (e.g., towers, base stations) that relay the location data for monitored population. As noted above information about individual cell receivers can be added by the monitoring device and/or the cell receiver itself.

At 1008, central monitoring location uses the locations of the monitoring devices 12 and their information of the corresponding cell receivers that relayed data from the monitoring devices to determine geographic characteristics about those cell receivers. As noted above, non-limiting examples of those geographic characteristics include a map of the cellular receiver coverage areas, or an artificial position marker and corresponding range. At 1010, that information is stored as a table, database or the like.

Referring to FIG. 11, various steps in an embodiment of the methodology are shown for examining the location data from an individual monitoring device for irregularity. The steps of FIG. 11 are preferably performed after the steps of FIG. 10 are complete, but the invention is not so limited and there may be a degree of concurrency there between.

At 1102, a particular monitoring device transmits at least location data representing its location, either in near real time or as a batch transfer of accumulating locations over time. This may occur after the events of FIG. 11, or may be a part of 1004 as shown by the dashed line.

At 1104, central monitoring location receives the location data from the particular monitoring device, along with information about the particular individual cell receiver that the particular monitoring device used to send the location data. This may occur after the events of FIG. 10, or may be a part of 1006 as shown by the dashed line. As noted above, information about the cell receiver can be added by the monitoring device, the cell receiver itself, and/or other intermediate equipment in the cell network.

At 1106, central monitoring location 35 identifies the expected cell receiver from the received location data of the monitoring device. At 1108, central monitoring location determines if the particular cell receiver with which the device was in communication with at the time the GPS location data was captured is the expected cell receiver. This may include one or more of the tracking or cellular tests described herein.

At 1110, the system responds based on the result of 1108. If the particular cell receiver is the expected cell receiver, then there is no follow up action based on that comparison (although other events as known in the art may be present that require action). If the particular cell receiver is not the expected cell receiver, then the system can react with notifications, alerts, flags or the like. The system can also react (or elect not to) based on additional consideration of other geographic factors or non-geographic factors as discussed herein.

It is to be understood that the steps of FIGS. 10 and 11 may be in whole or in part performed individually, sequentially and/or concurrently. For example, the determining of 1008 could be deferred until enough location data is received to provide meaningful results. In the alternative, the determination of 1008 could be performed concurrently with the receipt of data at 1006 such that results are built up over time. It is contemplated that the steps could be run a first time, and then periodically updated by relying upon a complete set of new data, or a combination of older and newer data.

Figure 12:
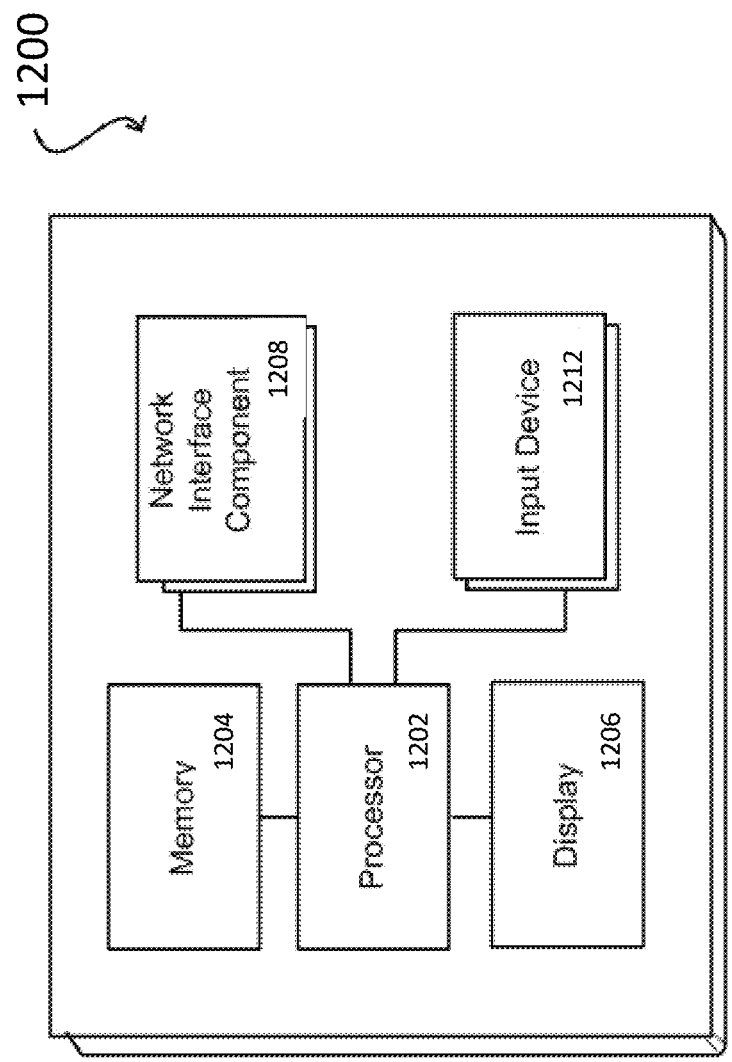
FIG. 12 illustrates a logical arrangement of a set of general components of an example computing device that can be utilized in accordance with various embodiments.

FIG. 12 illustrates a logical arrangement of a set of general components of an example computing device 1200 as could be used for the computer elements of monitoring device 12 and/or central monitoring location 35. In this example, the device includes a processor 1202 for executing instructions that can be stored in a memory device or element 1204. As would be apparent to one of ordinary skill in the art, the device can include many types of memory, data storage, or non-transitory computer-readable storage media, such as a first data storage for program instructions for execution by the processor 1202, a separate storage for images or data, a removable memory for sharing information with other devices, etc. The device typically will include some type of display element 1206, such as a touch screen or liquid crystal display (LCD), although devices such as portable media players might convey information via other means, such as through audio speakers. As discussed, the device in many embodiments will include at least one input element 1208 able to receive conventional input from a user. This conventional input can include, for example, a push button, touch pad, touch screen, keyboard, mouse, keypad, or any other such device or element whereby a user can input a command to the device. In some embodiments, the computing device 1200 of FIG. 12 can include one or more network interface elements 1208 for communicating over various networks, such as a Wi-Fi, Bluetooth, RF, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for detecting potential tampering with a data stream from a monitoring device, comprising:
    deploying a plurality of monitoring devices to a monitored population, each of the monitoring devices configured to transmit at least location data representing its approximate location;
    receiving the location data for a particular monitoring device and information about a particular cell receiver that relayed the location data from the particular monitoring device;
    identifying, based on an approximate location of the particular monitoring device from the location data received during the receiving, an expected cell receiver for the approximate location;
    comparing the particular cell receiver with the expected cell receiver;
    wherein the particular cell receiver is considered to be unexpected in response to at least a negative result of the comparing.

2. The method of claim 1, further comprising determining, based at least on received content of the receiving, if the particular cell receiver is an unexpected cell receiver or an expected cell receiver for the particular monitoring device.

3. The method of claim 2, wherein the determining comprises determining, based on a location of the particular monitoring device, whether the particular monitoring device communicated with the expected cell receiver.

4. The method of claim 2, wherein the determining comprises:
    identifying, based on a location of the particular monitoring device, the expected cell receiver for that location.

5. The method of claim 1, further comprising determining, from received content of the receiving, at least one expected geographic characteristic of the particular cell receiver.

6. The method of claim 5, wherein the determining comprises establishing an artificial geographic marker for the particular cell receiver, the marker representing an approximate average position of movement of the monitored population within the particular cell receiver.

7. The method of claim 6, wherein the determining comprises:
    identifying, from a location of the particular monitoring device and proximity of at least one of the artificial geographic markers, the expected cell receiver;
    comparing the particular cell receiver with the expected cell receiver.

8. The method of claim 1, further comprising issuing an alert to authorities when the particular cell receiver is not the expected cell receiver.

9. The method of claim 1, further comprising:
    determining at least one of the following:
        whether the particular cell receiver is a base station from an authorized source;
        whether a number of monitored devices using the particular cell receiver is above a predetermined number;
    issuing an alert to authorities when the particular cell receiver is not the expected cell receiver and a negative or mixed result of the determining.

10. The method of claim 1, further comprising:
    determining at least one of the following:
        whether the particular cell receiver is a base station from an authorized source;
        whether a number of monitored devices using the particular cell receiver is above a predetermined number;
    issuing an alert to authorities when the particular cell receiver is not the expected cell receiver and a negative or mixed result of the determining.

11. A system for detecting potential tampering with a data stream from a monitoring device, comprising:
    a plurality of monitoring devices deployed to a monitored population, each of the monitoring devices configured to transmit at least location data representing its approximate location;
    a central location having a memory storing instructions and a process for executing the instructions to perform operations comprising:
        receiving the location data for a particular monitoring device and information about a particular cell receiver that relayed the location data from the particular monitoring device;
        identifying, based on an approximate location of the particular monitoring device from the location data received during the receiving, an expected cell receiver for the approximate location;
        comparing the particular cell receiver with the expected cell receiver;
        wherein the particular cell receiver is considered to be unexpected in response to at least a negative result of the comparing.

12. The system of claim 11, further comprising determining, based at least on received content of the receiving, if the particular cell receiver is an unexpected cell receiver or an expected cell receiver for the particular monitoring device.

13. The system of claim 12, wherein the determining comprises determining, based on a location of the particular monitoring device, whether the particular monitoring device communicated with the expected cell receiver.

14. The system of claim 12, wherein the determining comprises:
    identifying, based on a location of the particular monitoring device, the expected cell receiver for that location;
    comparing the particular cell receiver with the expected cell receiver.

15. The system of claim 11, further comprising determining, from received content of the receiving, at least one expected geographic characteristic of the particular cell receiver.

16. The system of claim 15, wherein the determining comprises establishing an artificial geographic marker for the particular cell receiver, the marker representing an approximate average position of movement of the monitored population within the particular cell receiver.

17. The system of claim 16, wherein the determining comprises:
   identifying, from a location of the particular monitoring device and proximity of at least one of the artificial geographic markers, the expected cell receiver;
   comparing the particular cell receiver with the expected cell receiver.

18. The system of claim 11, further comprising issuing an alert to authorities when the particular cell receiver is not the expected cell receiver.

19. The system of claim 11, further comprising:
   determining at least one of the following:
      whether the particular cell receiver is a base station from an authorized source;
      whether a number of monitored devices using the particular cell receiver is above a predetermined number;
   issuing an alert to authorities when the particular cell receiver is not the expected cell receiver and a negative or mixed result of the determining.

20. The system of claim 11, further comprising:
   determining at least one of the following:
      whether the particular cell receiver is a base station from an authorized source;
      whether a number of monitored devices using the particular cell receiver is above a predetermined number;
   issuing an alert to authorities when the particular cell receiver is not the expected cell receiver and a negative or mixed result of the determining.

* * * * *